(12) United States Patent
Weiershausen

(10) Patent No.: US 10,774,567 B2
(45) Date of Patent: Sep. 15, 2020

(54) HOOP LOCK

(71) Applicant: ABUS August Bremicker Söhne KG, Wetter-Volmarstein (DE)

(72) Inventor: Bernd Weiershausen, Rehe (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 0 days.

(21) Appl. No.: 16/407,563

(22) Filed: May 9, 2019

(65) Prior Publication Data
US 2019/0344849 A1 Nov. 14, 2019

(30) Foreign Application Priority Data

May 11, 2018 (DE) .......................... 10 2018 111 305

(51) Int. Cl.
*E05B 67/22* (2006.01)
*E05B 17/20* (2006.01)
*B62H 5/18* (2006.01)
*B62H 5/00* (2006.01)
(Continued)

(52) U.S. Cl.
CPC ............... *E05B 67/22* (2013.01); *B62H 5/00* (2013.01); *B62H 5/18* (2013.01); *E05B 17/2007* (2013.01); *E05B 17/2034* (2013.01); *E05B 47/0012* (2013.01); *E05B 47/0607* (2013.01)

(58) Field of Classification Search
CPC ............... E05B 17/2007; E05B 17/203; E05B 17/2034; E05B 17/2069; E05B 17/2073; E05B 17/208; E05B 67/00; E05B 67/06; E05B 67/22; E05B 67/24; E05B 67/26; B62H 5/00; B62H 5/14; B62H 5/18
See application file for complete search history.

(56) References Cited

U.S. PATENT DOCUMENTS

| 105,710 A | 7/1870 | Miller |
| 848,633 A | 4/1907 | Chubb |
| 957,033 A | 5/1910 | De Bruycker |

(Continued)

FOREIGN PATENT DOCUMENTS

| CN | 106836989 A | 6/2017 |
| DE | 10 2005 043 927 A1 | 3/2007 |

(Continued)

OTHER PUBLICATIONS

German patent office communication identifying references cited within corresponding application DE 10 2018 111 305.6 dated Apr. 4, 2019; 2 pages.

(Continued)

*Primary Examiner* — Christopher J Boswell
(74) *Attorney, Agent, or Firm* — Harness, Dickey & Pierce, P.L.C.

(57) ABSTRACT

The invention relates to a hoop lock having a lock body and a hoop which is movable relative to the lock body between an open position and a closed position, wherein a latch is arranged in the lock body that is selectively movable into an unlocked position or into a locked position, with the latch locking the hoop at the lock body when the hoop is in the closed position and the latch is in the locked position. The latch is fastened to a pivot lever pivotable about a pivot axis and is movable between the unlocked position and the locked position by a pivot movement of the pivot lever.

11 Claims, 5 Drawing Sheets

(51) Int. Cl.
*E05B 47/00* (2006.01)
*E05B 47/06* (2006.01)

(56) References Cited

U.S. PATENT DOCUMENTS

| | | | | |
|---|---|---|---|---|
| 1,246,287 | A * | 11/1917 | Lemon | E05B 67/24 70/38 A |
| 1,564,462 | A | 12/1925 | Best | |
| 1,659,664 | A | 2/1928 | Page | |
| 1,703,193 | A | 2/1929 | Jacobi | |
| 1,743,331 | A * | 1/1930 | Ellison | E05B 67/22 70/38 A |
| 2,160,294 | A * | 5/1939 | Soref | E05B 67/22 70/38 B |
| 2,281,088 | A * | 4/1942 | Nelson | E05B 67/24 70/38 B |
| 2,419,213 | A * | 4/1947 | Hines | E05B 67/24 70/38 A |
| 2,678,554 | A * | 5/1954 | Palmer | E05B 67/22 70/38 A |
| 3,901,057 | A * | 8/1975 | Coley, Sr. | E05B 47/00 70/20 |
| 4,112,716 | A * | 9/1978 | Wippich | E05B 67/003 70/38 C |
| 5,791,172 | A * | 8/1998 | Deighton | E05B 19/0005 292/199 |
| 6,584,815 | B2 * | 7/2003 | Bremicker | E05B 67/04 70/38 A |
| 6,993,943 | B1 | 2/2006 | Chang | |
| 7,076,976 | B1 | 7/2006 | Goldman | |
| 2011/0023563 | A1 * | 2/2011 | Huang | E05B 35/007 70/31 |

FOREIGN PATENT DOCUMENTS

| | | |
|---|---|---|
| DE | 10 2009 030 031 A1 | 12/2010 |
| EP | 2267256 A2 | 12/2010 |
| FR | 596278 A | 10/1925 |
| FR | 644221 A | 10/1928 |

OTHER PUBLICATIONS

European Search Report for corresponding EP Application No. 19173197.5 dated Nov. 6, 2019. No translation provided. 3 pages.

* cited by examiner

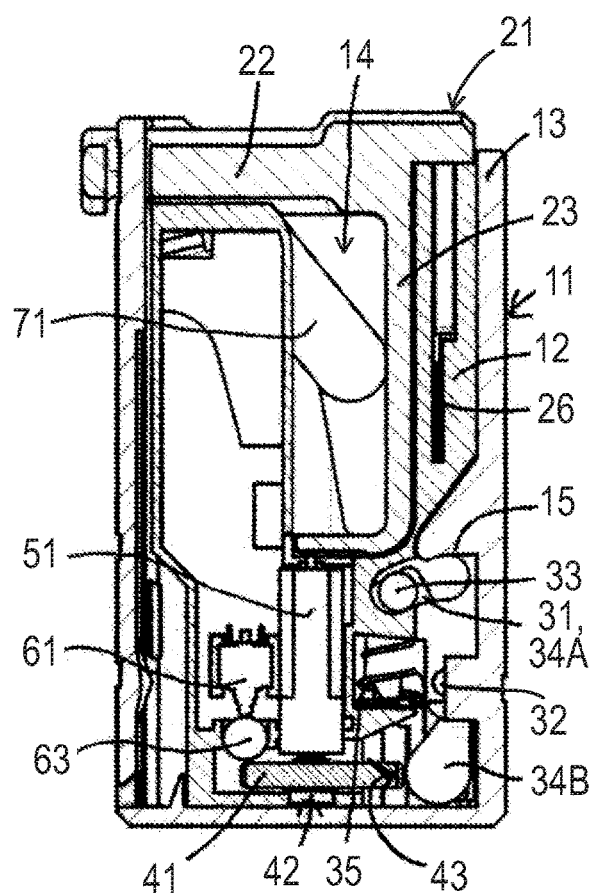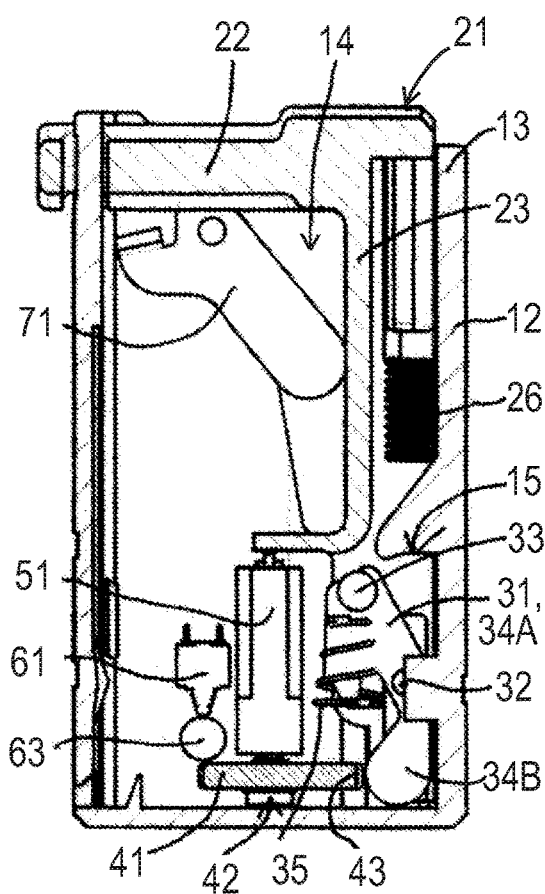
Fig. 9    Fig. 10
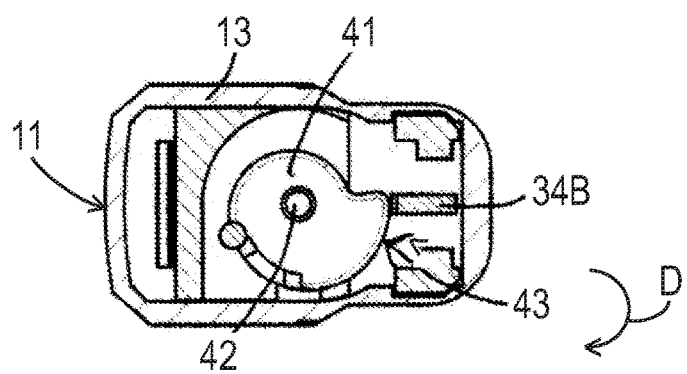
Fig. 11

HOOP LOCK

CROSS-REFERENCE TO RELATED APPLICATIONS

This application claims the benefit and priority of German application number 10 2018 111305.6 filed May 11, 2018. The entire disclosure of the above application is incorporated herein by reference.

FIELD

The disclosure relates to a hoop lock having a lock body and a hoop which is movable relative to the lock body between an open position and a closed position, wherein a latch is arranged in the lock body that is selectively movable into an unlocked position or into a locked position, with the latch locking the hoop at the lock body when the hoop is in the closed position and the latch is in the locked position.

BACKGROUND

Such a hoop lock is known, for example, as a padlock which has an essentially U-shaped hoop. The hoop can be guided through an eyelet or the like in its open position to secure an object (e.g. a door with a hasp).

In another embodiment, such a hoop lock is configured as a brake disk lock which serves for the securing, for example, of a motorcycle, of a motor scooter or of bicycle against unauthorized use. The hoop for this purpose engages through an opening of a brake disk of the parked vehicle. The lock is thus captured at the brake disk by the hoop locked in the closed position and the use of the vehicle is prevented until the lock is again released from the brake disk.

The locking device of such a hoop lock must have parts movable within the lock housing to be able to selectively lock the hoop to the lock body in its closed position. For this purpose, the lock housing typically has different holding and guidance sections for the movable parts of the locking device which are in particular of a three-dimensional structure. The lock body, however, hereby has an unwantedly complex design and is accordingly expensive in manufacture. The lock body frequently has unwantedly large dimensions for some applications.

A hoop lock of the category is described in DE 10 2009 030 031 A1.

SUMMARY

It is an object of the invention to provide a hoop lock of the initially named kind that has a simple design and enables a slim construction shape.

The object is satisfied by a hoop lock having the features of claim 1. In the hoop lock in accordance with the invention, the latch is fastened to a pivot lever pivotable about a pivot axis and is movable by a pivot movement of the pivot lever between the unlocked position and the locked position.

The latch likewise carries out a pivot movement along a curved trajectory between the unlocked position and the locked position, which is achieved by a spacing apart of the latch from the pivot axis. The pivot lever can, for example, be inwardly supported at the lock body (in particular at a housing section). The number of components, in particular of moving components, can be reduced in comparison with a hoop lock having a linearly movable latch by the arrangement of the latch at a pivot lever. The susceptibility with respect to corrosion or contamination that can result in a jamming of the latch or in other functional impairments in conventional hoop locks having a linearly movable latch is reduced with the hoop lock in accordance with the invention.

The latch can be fastened to the pivot lever in that the latch and the pivot lever originally form two separate components that are permanently connected to one another; or in that the latch and the pivot lever are originally formed in one part. The latch can in particular be designed in the form of a pin. The latch can in particular extend in parallel with the pivot axis of the pivot lever. Since the latch is fixedly coupled to the pivot lever, the unlocked position and the locked position of the latch are identical to an unlocked position or locked position of the pivot lever.

In accordance with an advantageous embodiment of the invention, the pivot lever, including the latch, has a mass distribution with respect to the pivot axis that is selected such that an impulse acting transversely to the pivot axis on the hoop lock causes at least substantially no pivot movement of the pivot lever. Said impulse can in particular be an impulse directed in the direction of the unlocked position of the latch. To open a lock in an unauthorized manner, an attempt is made on a manipulation also known as a hammer blow method to strongly accelerate a lock body by a direct powerful blow with a hammer on said lock body, with the latch undergoing this acceleration only in part and in particular with a time delay due to its mass of inertia. The latch should hereby at least briefly move into its unlocked position due to the relative movement between the lock body and the latch, whereby the hoop is released at least for a time and can be opened or jumps open independently.

Under certain circumstances, the force of a spring provided for preloading the latch into the locked position is alone not sufficient to prevent such a manipulation based on the mass of inertia of the latch. However, due to the arrangement of the latch on a pivot lever, a mass balancing is possible that in the ideal case effects a mass distribution of the pivot lever, including the latch, substantially free of unbalance so that, on the one hand, that main axis of a moment of inertia of the pivot lever, including the latch, that extends in parallel with the pivot axis of the pivot lever and, on the other hand, the pivot axes at least substantially coincide. An unbalance can, however, at least be reduced so much by a suitable choice of the mass distribution that, for example, a preload of the latch by a spring prevents an impulse-induced pivot movement. The balance of the mass distribution in particular includes lever arms that can be provided at the pivot lever in accordance with an embodiment described in more detail in the following and also include other designs and the latch. Such a mass balancing is not possible or is only possible with substantial additional effort with a linearly displaceably latch.

The pivot lever advantageously comprises a first lever arm and a second lever arm, with the latch being fastened to the first lever arm, in particular spaced apart from the pivot axis. The second lever arm can inter alia serve for the above-described mass balancing and can additionally also transmit a movement of an actuation device for the hoop lock onto the latch. The lever arms can in particular be arranged opposite one another with respect to the pivot axis. The lever arms advantageously have substantially the same moments of inertia with respect to the pivot axis of the pivot lever.

In accordance with a further advantageous embodiment, the latch is preloaded in the direction of the locked position. The preload of the latch is equivalent to a preload of the pivot lever in the direction of the locked position due to the fixed coupling. The preload can, for example, take place by means of a spring, in particular a compression spring or a tension spring, for example in the form of a spiral spring. An automatic locking is in particular possible on a closing of the hoop due to the preload of the latch in the direction of the locked position.

In accordance with a further advantageous embodiment, an actuation deice that cooperates with the pivot lever is arranged in the lock body to move the latch against its preload from the locked position into the unlocked position. A return of the latch from the unlocked position into the locked position takes place by the preload of the latch. The actuation device accordingly only has to support or initiate the unlocking procedure.

The actuation device advantageously cooperates with the second lever arm. A force deflection can in particular hereby take place such that the direction of movement of the latch and a direction of movement exerted by the actuation apparatus extend in different directions, preferably opposite directions. A compact manner of construction of the hoop lock can thereby be implemented.

In accordance with yet a further advantageous embodiment, the actuation device comprises a cam disk rotatable about an axis of rotation and having a cam section extending eccentrically with respect to the axis of rotation, with the cam section pivoting the pivot lever from the locked position into the unlocked position when the cam disk is in a predetermined unlocked position. The predetermined unlocked position does not necessarily comprise a discrete angle, but can rather also extend over a predefined angular range. When the cam disk is outside the unlocked position, the cam section is out of engagement with the pivot lever so that the pivot lever is freely movable. This free movability in particular enables the above-mentioned automatic locking of the hoop.

The actuation device advantageously comprises an electric motor and a control unit connected to the electric motor, with the control unit being adapted to actuate the electric motor after the reception of a transmitted unlocking command such that the cam section pivots the pivot lever at least temporarily into the unlocked position. The unlocking command can in particular take place wirelessly, for example by a remote control unit. Alternatively, the actuation device can also comprise a key-actuated lock cylinder, with the cam disk being able to be driven directly or indirectly by the lock cylinder via further transmission members. An at least temporary pivoting of the pivot lever into the unlocked position means that the pivot lever is pivoted into the unlocked position either temporarily, i.e. for a brief, in particular predefined period of time, with the cam disk not necessarily having to be stopped in the unlocked position, which will be explained in more detail in the following. Alternatively, however, the actuation device can also have the effect that the cam disk is stopped in the unlocked position so that the pivot lever can also remain in the unlocked position for a longer lasting time.

It has proved advantageous in this connection for the control unit to be adapted to actuate the electric motor after reception of a transmitted unlocking command such that the cam disk is rotated by exactly one revolution or a whole-number multiple of one revolution. The cam section of the cam disk in this respect only temporarily unlocks the hoop. During the time period of the unlocking, the hoop can be opened automatically by a corresponding preload, for example in a manner described in more detail below. To ensure the exact observation of the exactly one revolution or multiple revolutions of the cam disk, it may be necessary to determine the rotational position of the cam disk. A detector, in particular a position switch, for the optical or mechanical scanning of the cam disk, in particular of a position marking or elevated portion provided at the cam disk, can be provided for this purpose.

The hoop and/or an inner housing of the lock body advantageously has/have a respective slit-shaped cutout, with the first lever arm of the pivot lever extending into the respective cutout, in particular while the latch is in the locked position and/or while the latch is in the unlocked position. A particularly compact design of the hoop lock thereby becomes possible and the pivot lever can be laterally stabilized by its engagement into the slit-shaped cutout. The respective cutout is advantageously located in a main plane of extent of the hoop and coincides with a pivot plane of the pivot lever extending through the first lever arm such that a symmetrical arrangement of the latch and hoop is present with respect to the plane of extent of the hoop and thus a uniform force transmission between the hoop, the latch, and the lock body is present. The cutout in particular extends along a linear direction of movement. The latch preferably extends at both sides of the first lever arm, i.e. at both sides of the pivot plane of the pivot lever extending through the first lever arm.

In accordance with a further advantageous embodiment, the hoop is preloaded in the direction of the open position, with the hoop being moved by the preload from the closed position into the open position when the latch is moved into the unlocked position. The operation of the hoop lock is thereby simplified since only the unlocking movement of the latch has to be initiated, but not the automatic opening movement of the hoop.

The hoop advantageously has a locking section with which the latch is in engagement when the hoop is in the closed position and the latch is in the locked position, and with the hoop having a slot section that cooperates with the latch such that the latch is temporarily moved into the locked position against its preload by a movement of the hoop from the open position into the closed position and being moved back due to its preload into the locked position and entering into engagement with the locking section on reaching the closed position. When the hoop is in the closed position and the latch is in the locked position, a cooperation of the latch with the locking section prevents an opening of the hoop. The engagement can take place such that a slight clearance between the locking section and the latch can still be present. The locking section and/or the slot section can in particular be located in the region of the above-mentioned slit-shaped cutout, which can result in the locking section and/or the slot section being divided into two, i.e. it can be interrupted by the slit-shaped cutout.

In accordance with an embodiment, the latch comprises two ends that are opposite one another and that are arranged on sides of the pivot lever opposite one another, with the hoop having two locking sections and with each of the two ends of the latch being in engagement with one of the two locking sections of the hoop when the hoop is in the closed position and the latch is in the locked position. The two ends of the latch can in particular be aligned along an axis that extends in parallel with the pivot axis of the pivot lever. Since the latch engages at the hoop via two ends between which the pivot lever extends, a uniform and thus particularly stable force transmission is possible between the hoop, on the one hand, and the latch or the pivot lever and its pivot bearing, on the other hand, in particular without additional tilt moments (apart from the intended pivot movement about the pivot axis).

The lock body advantageously comprises a blocking section with which the latch is in engagement when the latch is in the locked position. Alternatively to this, the lock body can have a blocking section that is arranged directly adjacent to the latch when the latch is in the locked positon, in particular directly adjacent in a direction that corresponds to the direction of movement of the hoop on a movement from the closed position into the open position. Forces that act on the latch and thus on a bearing of the pivot lever on a forcible opening attempt of the hoop can thereby be led off fully or partly via the blocking section onto the lock body. The blocking section is advantageously formed as correspondingly solid for this purpose. The blocking section can likewise have a cutout and thereby be divided into two.

In accordance with an advantageous embodiment, the hoop is linearly movable in a direction of movement. Alternatively or additionally, the hoop can also be pivotably supported at the lock body.

In accordance with a particularly advantageous embodiment, the hoop lock is configured as a brake disk lock having a receiving gap for a brake disk, with the hoop being substantially L-shaped in the open position outside the lock body and having an elongate securing section and an elongate connection section, with the securing section extending transversely to the direction of movement of the hoop and having a free end, with the connection section substantially extending in parallel with the direction of movement of the hoop and connecting the securing section to the lock body, and with the hoop bounding the receiving gap together with the lock body in the closed position. The hoop is thus substantially hook-shaped in its open position and open to the side. Said free end of the securing section can thus be introduced into a fastening opening of an object to be secured, in particular into a ventilation opening of a brake disk, that is located in the receiving gap of the brake disk lock or of the lock body. A form-fit of the securing section of the hoop with the lock body is effected by moving the hoop into the closed position to fix the hoop lock to the respective object. The securing section closes the receiving gap wen the hoop is in the closed position.

In accordance with an embodiment, the connection section of the hoop can have a non-round cross-section, in particular with a substantially rectangular outer periphery. The hoop can hereby admittedly be supported longitudinally movably, but secure against rotation, for example for a use of the hoop lock as a brake disk lock.

The hoop advantageously spans a plane of extent of the hoop, with the pivot axis of the pivot lever extending perpendicular to the plane of extent of the hoop. The plane of extent of the hoop is in particular spanned by said securing section and said connection section. A particularly compact and in particular flat design of the hoop lock can be achieved by the perpendicular arrangement of the pivot axis with respect to the plane of extent of the hoop. The plane of movement of the pivot lever can in particular coincide with the plane of extent of the hoop or can extend offset in parallel therewith.

It has further proved to be advantageous for the axis of rotation of the cam disk to extend in the plane of extent of the hoop or offset in parallel therewith, with the cam section being arranged at a peripheral side of the cam disk. To the extent that the hoop is linearly movable in a direction of movement, the axis of rotation of the cam disk and in particular also the axis of rotation of said electric motor advantageously extend in parallel with the direction of movement of the hoop. The direction of action of said cam section thus extends in a radially outwardly directed manner, i.e. perpendicular to the axis of rotation of the cam disk. Said alignment of the axis of rotation of the cam disk additionally supports the implementation of a design of the hoop lock that is as compact as possible and is in particular flat.

Further advantageous embodiments of the invention result from the dependent claims, from the drawings and from the description.

The invention will be explained in the following only by way of example with reference to the drawings, with the invention not being restricted to the brake disk lock described in the following, but rather also being used in other types of hoop locks, for example in padlocks.

FIGURES

There are shown:

FIG. 9 shows a longitudinal section of the brake disk lock of FIG. 1 in an unlocked position of the latch;

FIG. 10 shows a longitudinal section of the brake disk lock in accordance with FIG. 9 with a removed inner housing;

FIG. 11 shows a cross-section of the brake disk lock in accordance with FIGS. 9 and 10 (unlocked position of the latch);

DESCRIPTION

Figure 1:
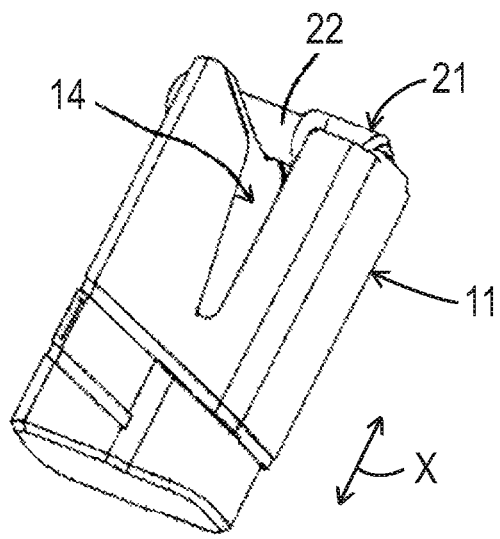
FIGS. 1 and 2 show perspective views of a brake disk lock in an open position and in a closed position respectively of the hoop.
Figure 2:
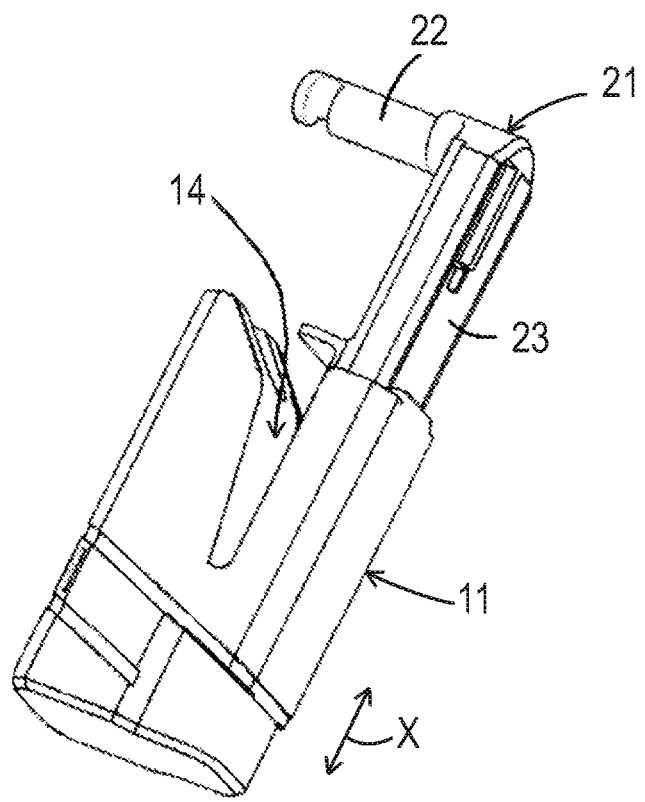

FIGS. 1 and 2 show a hoop lock which is configured as a brake disk lock and has a lock body 11 and a hoop 21. The hoop 21 is translatorily, i.e. linearly, movably supported in a direction of movement X at the lock body 11. FIG. 1 shows the hoop 21 in a closed position, whereas FIG. 2 shows the hoop 21 in an open position.

The lock body 11 has an outer housing 13 that is formed by a tubular section having a substantially rectangular cross-section and rounded edges. The longitudinal axis of the outer housing 13 corresponds to the direction of movement X of the hoop 21. The outer housing 12 has a receiving gap 14 at the end provided for the moving out of the hoop 21.

With respect to the open position in accordance with FIG. 2, in which the hoop 21 is moved out of the lock body 11, the hoop substantially has an L shape outside the lock body 11. The one limb of this L shape is formed by an elongate securing section 22 in the form of a hardened pin that extends perpendicular to the direction of movement X of the hoop 21. The other limb of the L shape is formed by an elongate connection section 23 that extends in parallel with the direction of movement X. The connection section 23 merges into a holding section 29 within the lock body 11. The securing section 22, the connection section 23, and the holding section 29 can be formed by a single casting.

The brake disk lock shown serves for the securing of a motorcycle or the like against an unauthorized use. For this purpose, the free end of the securing section 22 is introduced into an opening of a brake disk of the respective vehicle in the open position of the hoop 21 in accordance with FIG. 2. Subsequently, the lock body 11 is placed onto the brake disk such that the brake disk engages into the receiving gap 14 and the hoop 21 adopts the closed position in accordance with FIG. 1 in which the securing section 22 of the hoop 21 closes the receiving gap 14.

Figure 3:
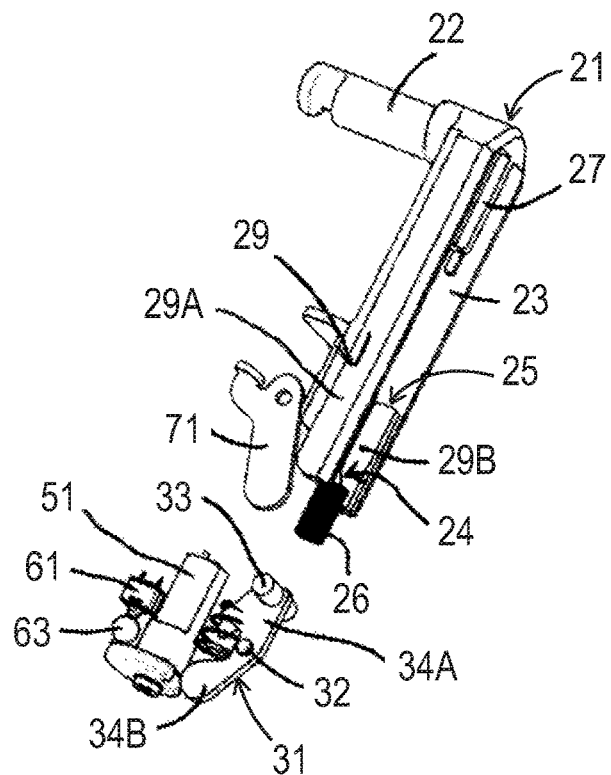
FIG. 3 shows a perspective view of parts of the brake disk lock of FIG. 2 with a removed housing.
Figure 4:
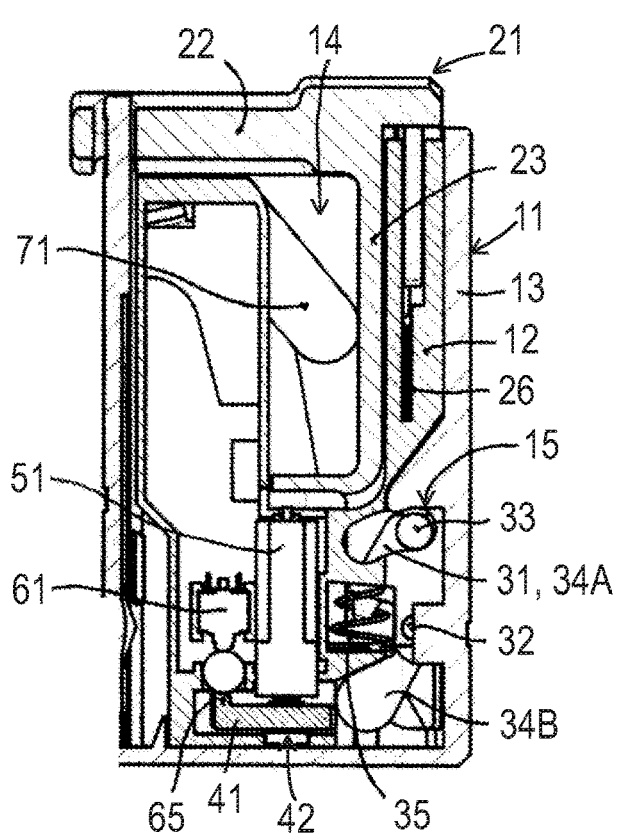
FIG. 4 shows a longitudinal section of the brake disk lock of FIG. 1 in the closed position of the hoop and in a locked position of the latch.
Figure 5:
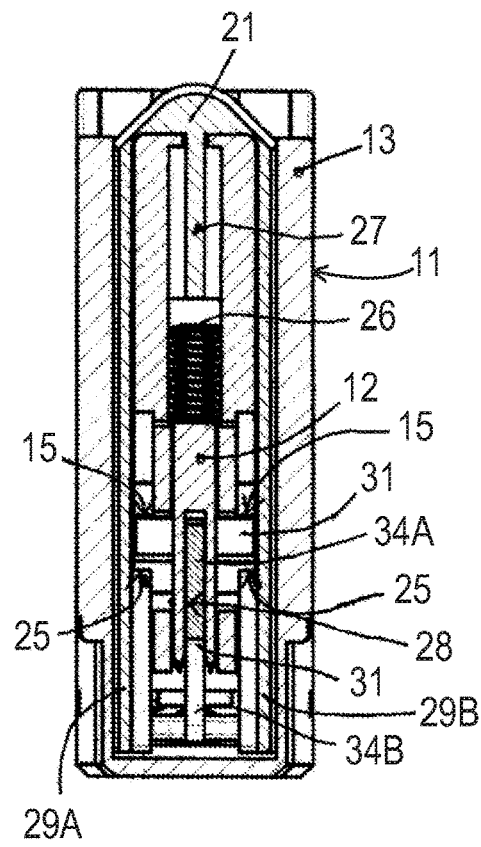
FIG. 5 shows a longitudinal section of the brake disk lock of FIG. 1 along a plane perpendicular to the sectional plane in accordance with FIG. 4.
Figure 6:
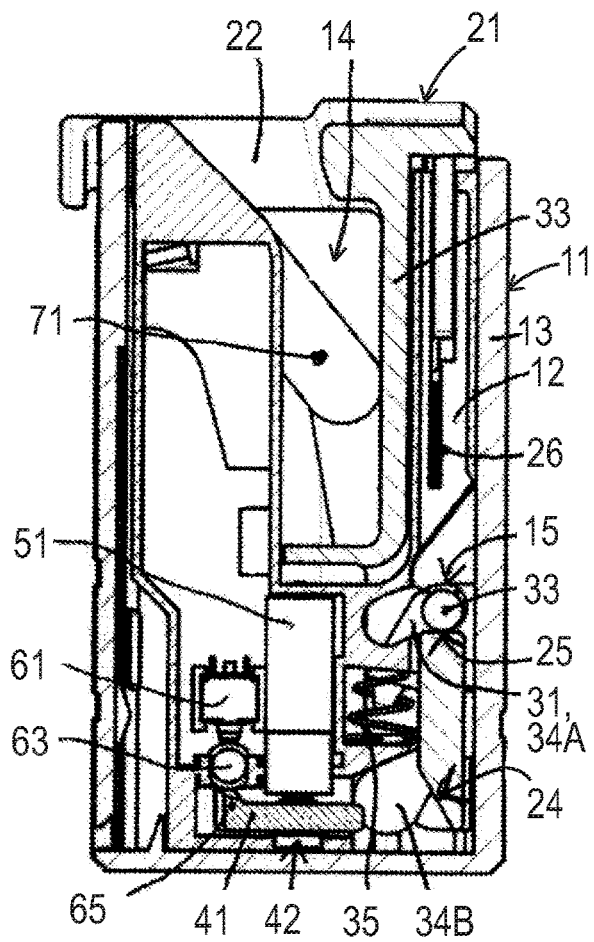
FIG. 6 shows a further longitudinal section of the brake disk lock of FIG. 1 along a plane that extends in parallel with the sectional plane in accordance with FIG. 4.
Figure 7:
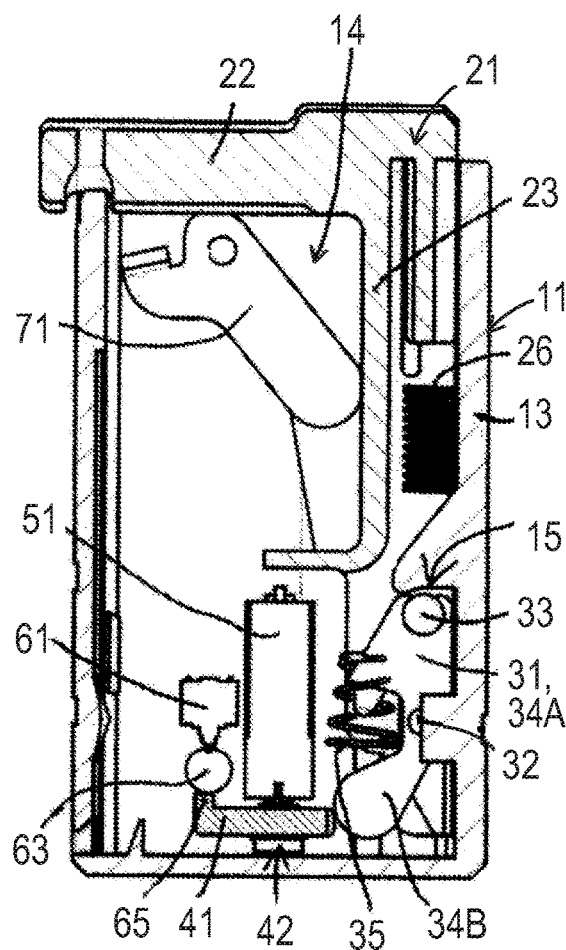
FIG. 7 shows a longitudinal section of the brake disk lock of FIG. 1 in accordance with FIG. 4 with a removed inner housing.
Figure 8:
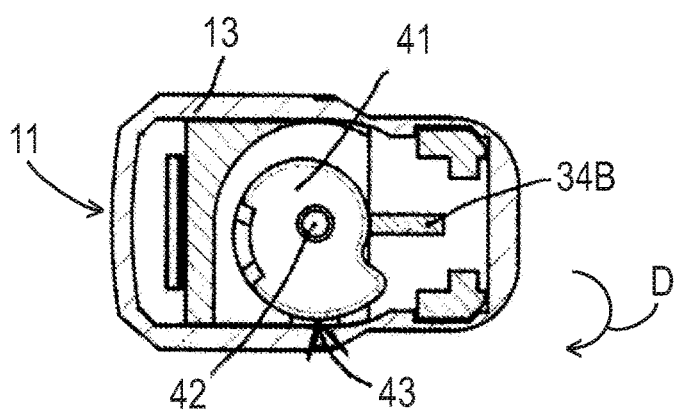
FIG. 8 shows a cross-section of the brake disk lock of FIG. 1 (locked position of the latch)

FIG. 3 shows the hoop 21 in the open position, with the outer housing 13 and an inner housing 12 of the lock body 11 being omitted. In addition to the securing section 22, the connection section 23, and the holding section 29 of the hoop 21, a pivot lever 31 can thus be recognized that has a first lever arm 34A and a second lever arm 34B. A pin-shaped latch 33 having a cylindrical cross-section is arranged at the free end of the first lever arm 34A. An actuation device for the pivot lever 31 is furthermore shown and will be described in more detail in the following. Finally, a rocker 71 is also shown whose function will likewise be explained below.

Further details of the brake disk lock are shown in FIGS. 4 to 15 that show the brake disk lock with different positions of the hoop 21 or of the latch 33. The pivot lever 31 is pivotably supported at the outer housing 13 about a pivot axis 32. The pivot axis 32 extends perpendicular to the planes of the drawings of FIGS. 4, 6, 7, 9, 10, 12 and 14. The pin-shaped latch 33 extends at both sides of the first lever arm 34A and its longitudinal axis extends in parallel with the pivot axis 32.

A slit-shaped cutout 28 within which the pivot lever 31 or the first lever arm 34A can move extends in parallel with the longitudinal axis of the outer housing 13 and is introduced in a part section of the inner housing 12.

The holding section 29 of the hoop 21 has a corresponding slit-shaped cutout so that the holding section 29 is divided into two mutually oppositely disposed limbs 29A, 29B. The holding section 29 generally has a locking section 25 extending transversely to the direction of movement X of the hoop 21 and a slot section 24 extending obliquely to the direction of movement X, with the locking section 25 and the slot section 24 being divided by the cutout in the holding section 29 such that a respective part section of the locking section 25 and a part section of the slot section 24 are formed at each limb 29A, 29B. The pivot lever 31 or the first lever arm 34A extends between the two limbs 29A, 29B, with a respective axial end of the latch 33 cooperating with a respective part section of the locking section 25 or of the slot section 24. The hoop 21 thus effectively comprises two locking sections 25 and two slot sections 24 in a center-symmetrical arrangement (cf. FIGS. 3 and 5) that each cooperate with an associated end of the latch 33, with in the following reference only being made for reasons of simplicity to one locking section 25 or slot section 24.

A blocking section 15 is formed at the outer housing 13 and is disposed opposite the locking section 25 in the closed position of the hoop 21 so that the locking section 25 and the blocking section 15 form a receiver for the latch 33 in the closed position. The blocking section 15 is likewise divided.

The hoop 21 is preloaded in the direction of the open position by means of a hoop preloading spring 26, with the hoop preloading spring 26 being supported at the inner housing 12, on the one hand, and at a centering section 27 of the hoop 21, on the other hand. In the drawings, the hoop preloading spring 26 is always shown in a compressed state, even when the hoop 21 is in an intermediate position or in the open position.

The pivot lever 31 is preloaded in the direction of its locked position (FIGS. 4 to 8) by means of a pivot lever preloading spring 35.

An actuation device is provided in the interior of the lock body 11 and comprises an electric motor 51 that can rotatably drive a cam disk 41 whose axis of rotation 42 extends in parallel with the direction of movement X of the hoop 21. A cam section 43 that cooperates with the second lever arm 34B of the pivot lever 31 is formed at the peripheral side of the cam disk 41. An elevated portion 65 that actuates a position switch 61 via a ball 63 is formed at the front side of the cam disk 41 facing the electric motor 51. The electric motor 51 and the position switch 61 are connected to a control unit (not shown).

The rocker 71 projecting into the receiving gap 14 is connected to a further position switch (not shown) that is configured to detect the position of the rocker 71. When an object, in particular a brake disk of a vehicle, is located in the receiving gap 14, this is signaled to the control unit. An alarm mode of the brake disk lock can hereby be activated in which manipulations and/or movements of the brake disk lock can be detected by suitable sensors. In such a case, the control unit can control an alarm signal output device (not shown) to output an acoustic and/or visual alarm signal and/or to initiate the transmission of corresponding alarm reports by radio.

The operation of the brake disk lock will be explained in more detail in the following.

When the hoop 21 is in the closed position and the latch 33 is in the locked position (FIGS. 4 to 8), the hoop 21 is blocked at the respective locking section 25 by means of the latch 33 in the closed position and an opening of the hoop 21 is not possible. Any forces acting on the hoop 21 on a forcible opening attempt are transmitted from the locking section 25 via the latch 33 onto the blocking section 15 and thus onto the outer housing 13. Such opening forces thus at least do not act only on the axis of rotation 32 of the pivot lever 31 so that an unauthorized opening of the brake disk lock is not even possible on a possible breaking of the pivot axis 32.

For an authorized opening of the brake disk lock, a corresponding control command can be transmitted to the control unit, with this preferably taking place wirelessly, in particular by means of an associated remote control unit or of a correspondingly authorized end device of the user (e.g. a smartphone, a smart watch, a tablet, or the like). The control of the electric motor 51 takes place such that the cam disk 41 is driven by exactly one revolution in a direction of rotation D running clockwise (FIGS. 8, 11, 13, and 15). Once the cam disk 41 has made exactly one revolution, the electric motor 51 is deactivated again, which is controlled by means of the elevated portion 65 and of the position switch 61.

FIGS. 9 to 11 show an intermediate position of the brake disk lock with the rotated cam disk 41 in the unlocked position in which the cam section 43, due to the spacing of the cam section 43 from the axis of rotation 42 first increasing in the direction of rotation D pivots the second lever arm 34B of the pivot lever 31 in the direction of the adjacent wall of the outer housing 13. The latch 33 is pivoted from its locked position (FIGS. 4 to 8) into its unlocked position (FIGS. 9 and 10) by this pivot movement so that the latch 33 is now out of engagement with the blocking section 15 and the respective locking section 25.

Figure 12:
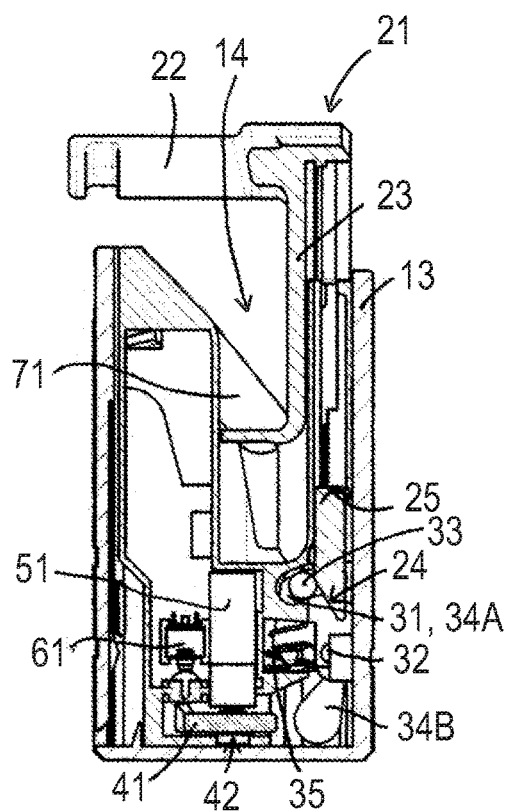
FIGS. 12 and 13 show a longitudinal section or a cross-section of the brake disk lock in an intermediate position of the hoop.
Figure 13:
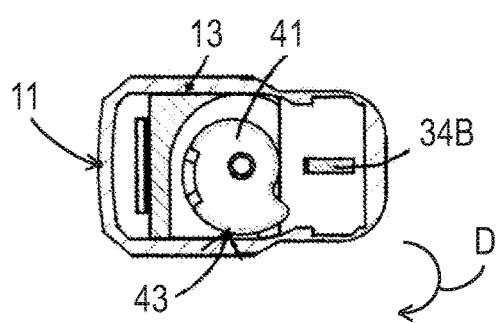

Due to the preload of the hoop 21, it now moves in the direction of its open position since the blocking by the latch 33 is canceled. This procedure is shown in FIG. 12 that shows the hoop 21 in an intermediate position. As the associated FIG. 13 shows, the cam disk 41 has in the meantime already returned into its base position in accordance with FIGS. 4 to 8. Since the second lever arm 34A is now no longer in engagement with the cam section 43, the pivot lever 31 can be urged back in the direction of its locked position by the pivot lever preloading spring 35. In this process, the latch 33 first slides along the wall of the holding section 29 exactly perpendicular to the respective locking section 25 or in parallel with the direction of movement X and finally returns to the locked position along the obliquely extending respective slot section 24.

Alternatively, the cam disk 41 can also be rotated about a plurality (e.g. two) revolutions so that an unlocking can also take place when the hoop 21 is temporarily blocked and does not immediately jump into its open position.

Figure 14:
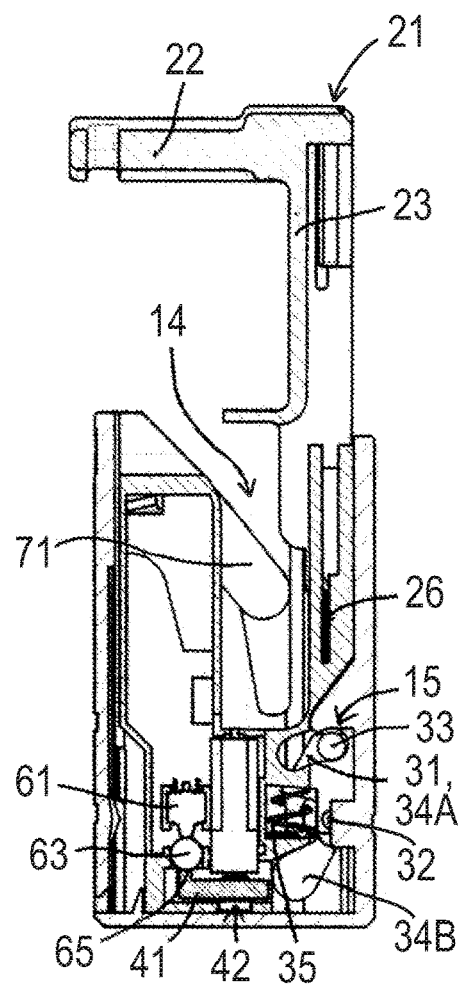
FIGS. 14 and 15 show a longitudinal section or a cross-section of the brake disk lock in the open position of the hoop.
Figure 15:
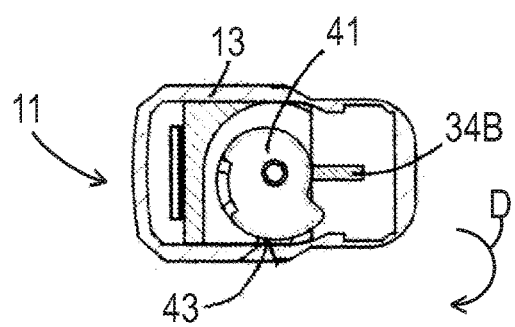

FIGS. 14 and 15 show the brake disk lock with the hoop 21 in its open position and with the latch 33 in its locked position.

The brake disk lock can now be fixed at a brake disk or the like and can then be moved into the closed position. To close the hoop 21, a force must be exerted on it that again compresses the hoop preloading spring 26. During the closing procedure, the latch 33 slides along the respective slot section 24 and is hereby moved from the locked position into the unlocked position (similar to FIG. 12). The latch 33 in turn slides along the lateral wall of the respective holding section 29 until the hoop 21 has reached the closed position. Due to the preload of the pivot lever preloading spring 35, the latch 33 springs from the unlocked position back into the locked position and moves into engagement with the blocking section 15 of the outer housing 13 and the locking section 25 of the hoop 21.

The brake disk lock hereby has an automatic function that makes an actuation of the electric motor 51 for locking the brake disk lock or the closed hoop 21 superfluous.

As is shown in FIG. 3, the first lever arm 34A and the second lever arm 34B are disposed opposite one another. A certain mass balancing is thereby achieved between the first lever arm 34A having the latch 33, 34B and the second lever arm 34B. The moment of inertia of the pivot lever 31, including the latch 33, is hereby very small with respect to impulses acting on the brake disk lock from the outside and transversely to the pivot axis 32. An unauthorized opening of the brake disk lock by the so-called hammer blow method in which a moment of inertia of the latch 33 should be utilized to temporarily move it into the unlocked position is largely precluded. It is generally not necessary to bring about a complete mass balancing at the pivot lever 31 for this purpose. Any remaining small moment of inertia with respect to the pivot axis 32 that could result in a rotational movement of the pivot lever 31 due to a translatory impulse acting transversely to the pivot axis 32 can be compensated by the pivot lever preloading spring 35.

The invention claimed is:

1. A hoop lock having a lock body and a hoop that is movable relative to the lock body between an open position and a closed position, wherein a latch is arranged in the interior of the lock body that is selectively movable into an unlocked position or into a locked position, with the latch locking the hoop at the lock body when the hoop is in the closed position and the latch is in the locked position, wherein the latch is fastened to a pivot lever pivotable about a pivot axis and is movable between the unlocked position and the locked position by a pivot movement of the pivot lever, wherein the latch is preloaded in the direction of the locked position, wherein an actuation device is arranged in the lock body and cooperates with the pivot lever to move the latch against its preload from the locked position into the unlocked position, wherein the actuation device comprises a cam disk rotatable about an axis of rotation and having a cam section; and wherein the cam section pivots the pivot lever from the locked position into the unlocked position when the cam disk is in a predetermined unlocked position, wherein the actuation device comprises an electric motor for driving the cam disk and a control unit connected to the electric motor; and wherein the control unit is configured to actuate the electric motor after reception of a transmitted unlocking command such that the cam section at least temporarily pivots the pivot lever into the unlocked position, wherein the control unit is configured to actuate the electric motor after reception of a transmitted unlocking command such that the cam disk is rotated by exactly one revolution or a whole-number multiple of one revolution.

2. A hoop lock in accordance with claim 1, wherein the pivot lever, including the latch, has a mass distribution with respect to the pivot axis that is selected such that an impulse acting on the hoop lock transversely to the pivot axis at least substantially does not cause a pivot movement of the pivot lever.

3. A hoop lock in accordance with claim 1, wherein the pivot lever comprises a first lever arm and a second lever arm, with the latch being fastened to the first lever arm.

4. A hoop lock in accordance with claim 3, wherein the actuation device cooperates with the second lever arm.

5. A hoop lock in accordance with claim 1, wherein the hoop is preloaded in the direction of the open position; and wherein the hoop is moved from the closed position into the open position by the preload when the latch is moved into the unlocked position.

6. A hoop lock in accordance with claim 1, wherein the latch is preloaded in the direction of the locked position; wherein the hoop has a locking section with which the latch is in engagement when the hoop is in the closed position and the latch is in the locked position, and with the hoop having a slot section that cooperates with the latch such that the latch is temporarily moved into the locked position against its preload by a movement of the hoop from the open position into the closed position and being moved back due to its preload into the locked position and entering into engagement with the locking section of the hoop, on reaching the closed position.

7. A hoop lock in accordance with claim 1, wherein the lock body comprises a blocking section with which the latch is in engagement or that is arranged directly adjacent to the latch when the latch is in the locked position.

8. A hoop lock in accordance with claim 1, wherein the hoop is linearly movable in a direction of movement.

9. A hoop lock in accordance with claim 8, wherein the hoop lock is configured as a brake disk lock having a receiving gap for a brake disk, with the hoop being substantially L-shaped in the open position outside the lock body and having an elongate securing section and an elongate connection section, with the securing section extending transversely to the direction of movement of the hoop and having a free end, with the connection section substantially extending in parallel with the direction of movement of the hoop and connecting the securing section to the lock body, and with the hoop bounding the receiving gap together with the lock body in the closed position.

10. A hoop lock in accordance with claim 1, wherein the hoop spans a plane of extent of the hoop; and wherein the pivot axis of the pivot lever extends perpendicular to the plane of extent of the hoop.

11. A hoop lock having a lock body and a hoop that is movable relative to the lock body between an open position and a closed position, wherein a latch is arranged in the interior of the lock body that is selectively movable into an unlocked position or into a locked position, with the latch locking the hoop at the lock body when the hoop is in the closed position and the latch is in the locked position, wherein the latch is fastened to a pivot lever pivotable about a pivot axis and is movable between the unlocked position and the locked position by a pivot movement of the pivot lever, wherein the latch is preloaded in the direction of the locked position, wherein an actuation device is arranged in the lock body and cooperates with the pivot lever to move the latch against its preload from the locked position into the unlocked position, wherein the actuation device comprises a cam disk rotatable about an axis of rotation and having a cam section; and wherein the cam section pivots the pivot lever from the locked position into the unlocked position when the cam disk is in a predetermined unlocked position, wherein the hoop spans a plane of extent of the hoop, wherein the pivot axis of the pivot lever extends perpendicular to the plane of extent of the hoop; wherein the axis of rotation of the cam disk extends in the plane of extent of the hoop or offset in parallel therewith; and wherein the cam section is arranged at a peripheral side of the cam disk.

* * * * *